(12) United States Patent
Park

(10) Patent No.: US 11,614,218 B2
(45) Date of Patent: Mar. 28, 2023

(54) COLOR CONVERSION MEMBER, BACKLIGHT UNIT AND DISPLAY DEVICE

(71) Applicant: LG Display Co., Ltd., Seoul (KR)

(72) Inventor: Hyunmin Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/521,544

(22) Filed: Nov. 8, 2021

(65) Prior Publication Data

US 2022/0170612 A1 Jun. 2, 2022

(30) Foreign Application Priority Data

Dec. 2, 2020 (KR) .......................... 10-2020-0166960

(51) Int. Cl.
*F21V 9/30* (2018.01)
*F21V 7/00* (2006.01)

(52) U.S. Cl.
CPC . *F21V 9/30* (2018.02); *F21V 7/00* (2013.01)

(58) Field of Classification Search
CPC .. F21K 9/60–90; F21K 2099/005; F21V 7/00; F21V 7/22; F21V 7/0025–0066; F21V 9/30–45; G02F 1/1336–133636
See application file for complete search history.

(56) References Cited

U.S. PATENT DOCUMENTS

| | | | | |
|---|---|---|---|---|
| 10,168,006 B2 * | 1/2019 | Chang | ........................ | F21K 9/60 |
| 10,338,433 B2 * | 7/2019 | Kurita | ............... | G02F 1/133603 |
| 10,353,223 B2 * | 7/2019 | Kim | ................... | G02F 1/133603 |
| 2020/0217998 A1 * | 7/2020 | Jung | ..................... | H01L 27/322 |

* cited by examiner

*Primary Examiner* — Jason M Han
(74) *Attorney, Agent, or Firm* — Birch, Stewart, Kolasch & Birch, LLP

(57) ABSTRACT

A color conversion member, a backlight unit and a display device are discussed. The color conversion member including a reflection partition wall and color conversion material is disposed between a light source and a light path control sheet, so that the thickness of the backlight unit can be reduced, and the wavelength conversion function and the light guide function can be easily implemented by the color conversion member. In addition, by adjusting the thickness of the reflection partition wall and the thickness of the color conversion material, or by adjusting the structure of a light source protection layer located under the color conversion member, it is possible to easily implement various optical properties needed according to the backlight unit without increasing the thickness of the backlight unit.

20 Claims, 9 Drawing Sheets

COLOR CONVERSION MEMBER, BACKLIGHT UNIT AND DISPLAY DEVICE

CROSS REFERENCE TO RELATED APPLICATION

This application claims priority to Korean Patent Application No. 10-2020-0166960, filed in the Republic of Korea on Dec. 2, 2020, the entire contents of which are hereby expressly incorporated by reference for all purposes as if fully set forth herein into the present application.

BACKGROUND

Field

The present disclosure relates to a color conversion member, a backlight unit and a display device.

Description of Related Art

The growth of the information society leads to increased demand for display devices to display images and use of various types of display devices, such as liquid crystal display devices, organic light emitting display devices, etc.

The liquid crystal display device can include a display panel including a liquid crystal layer and a backlight unit for supplying light to the display panel.

The backlight unit can include a plurality of light sources and various optical members for efficiently supplying light emitted from the plurality of light sources to the display panel. In addition, in order for the light emitted from the light source to be efficiently supplied to the display panel through various optical members, a specific distance between the light source and the display panel may be needed.

This can increase the thickness of the backlight unit and increase the thickness of the display device. In addition, if the thickness of the backlight unit is reduced to reduce the thickness of the display device, there can be deteriorated image quality displayed by the backlight unit.

Accordingly, there is a need for a method capable of constantly maintaining or improving the image quality displayed by the backlight unit and reducing the thickness of the backlight unit.

SUMMARY OF THE DISCLOSURE

Embodiments of the present disclosure can provide a manner for reducing the thickness of a backlight unit included in a display device and maintaining and improving the image quality displayed by the backlight unit.

Embodiments of the present disclosure can provide a manner for improving the efficiency of converting the wavelength of the light emitted from a light source by a color conversion material disposed in a backlight unit and reducing the thickness of the backlight unit.

In one aspect, embodiments of the present disclosure can provide a display device including a display panel, and a backlight unit for supplying light to the display panel.

The backlight unit can include a plurality of light sources disposed on a printed circuit, a first reflection plate disposed on the printed circuit and including a plurality of first holes located in areas corresponding respectively to the plurality of light sources, and a second reflection plate disposed on the first reflection plate, and including a plurality of second holes located in areas corresponding respectively to the plurality of first holes and a color conversion layer disposed in at least a partial area inside each of the plurality of second holes.

A size of a first angle between an inner surface of each of the plurality of first holes and an upper surface of the printed circuit can be different from a size of a second angle between an inner surface of each of the plurality of second holes and an upper surface of the first reflection plate.

For example, the size of the second angle can be greater than the size of the first angle.

In addition, an inner surface of each of the plurality of second holes can be inclined.

An area of each of the plurality of second holes can be greater than an area of each of the plurality of first holes. In addition, a boundary of each of the plurality of first holes can be located inside a boundary of each of the plurality of second holes.

In another aspect, embodiments of the present disclosure can provide a backlight unit including a plurality of light sources disposed on a printed circuit, a first reflection plate disposed on the printed circuit and including a plurality of first holes located in areas corresponding respectively to the plurality of light sources, and a second reflection plate disposed on the first reflection plate, and including a plurality of second holes located in areas corresponding respectively to the plurality of first holes and a color conversion layer disposed in at least a partial area inside each of the plurality of second holes.

In another aspect, embodiments of the present disclosure can provide a color conversion member including a reflection plate including a plurality of holes, in which an inner surface of each of the plurality of holes being inclined, and a color conversion layer located inside each of the plurality of holes and having a thickness equal to or less than a thickness of the reflection plate.

According to embodiments of the present disclosure, a color conversion member including a reflection partition wall and color conversion material is disposed on a light source included in a backlight unit, so that the thickness of the backlight unit can be reduced, and the wavelength conversion function and the light guide function can be implemented by the color conversion member.

According to embodiments of the present disclosure, it is possible to increase the wavelength conversion efficiency by the color conversion member by disposing the color conversion member between a light source and a light path control sheet having a specific reflection characteristic.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
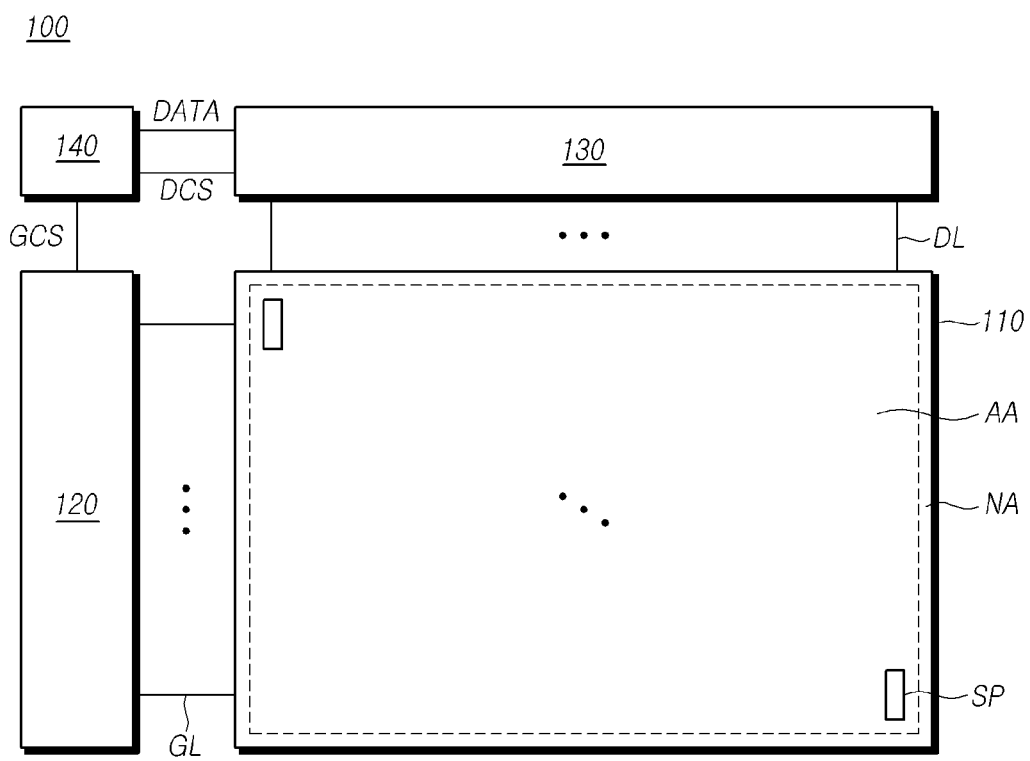
FIG. 1 schematically illustrates a configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 schematically illustrates a configuration included in a display device 100 according to embodiments of the present disclosure. All the components of each display device according to all embodiments of the present disclosure are operatively coupled and configured.

Referring to FIG. 1, the display device 100 can include a display panel 110, and a gate driving circuit 120, a data driving circuit 130 and a controller 140 for driving the display panel 110.

The display panel 110 can include an active area AA in which a plurality of subpixels SP are disposed, and a non-active area NA positioned outside the active area AA.

A plurality of gate lines GL and a plurality of data lines DL can be disposed on the display panel 110. The subpixel SP can be positioned in a region where the gate line GL and the data line DL intersect.

The gate driving circuit 120 is controlled by the controller 140. The gate driving circuit 120 can sequentially output scan signals to the plurality of gate lines GL arranged on the display panel 110, thereby controlling the driving timing of the plurality of subpixels SP.

The gate driving circuit 120 can include one or more gate driver integrated circuits GDIC. The gate driving circuit 120 can be located only at one side of the display panel 110, or can be located at both sides thereof according to a driving method.

Each gate driver integrated circuit GDIC can be connected to a bonding pad of the display panel 110 by a tape automated bonding (TAB) method or a chip-on-glass (COG) method. Alternatively, each gate driver integrated circuit GDIC can be implemented as a gate-in-panel (GIP) type and disposed directly on the display panel 110. Alternatively, each gate driver integrated circuit GDIC can be integrated and disposed on the display panel 110 in some cases. Alternatively, each gate driver integrated circuit GDIC can be implemented in a chip-on-film (COF) method mounted on a film connected to the display panel 110.

The data driving circuit 130 can receive data signal from the controller 140 and converts the data signal into an analog data voltage Vdata. The data driving circuit 130 outputs the data voltage Vdata to each data line DL according to the timing at which the scan signal is applied through the gate line GL so that each of the plurality of subpixels SP emits light having brightness according to the data signal.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding (TAB) method or a chip-on-glass (COG) method. Alternatively, each source driver integrated circuit SDIC can be disposed directly on the display panel 110. Alternatively, each source driver integrated circuit SDIC can be integrated and disposed on the display panel 110 in some cases. Alternatively, each source driver integrated circuit SDIC can be implemented in a chip-on-film (COF) manner. In this case, each source driver integrated circuit SDIC can be mounted on a film connected to the display panel 110, and can be electrically connected to the display panel 110 through lines on the film.

The controller 140 can supply various control signals to the gate driving circuit 120 and the data driving circuit 130, and control the operation of the gate driving circuit 120 and the data driving circuit 130.

The controller 140 can be mounted on a printed circuit board or a flexible printed circuit. The controller 140 can be electrically connected to the gate driving circuit 120 and the data driving circuit 130 through a printed circuit board or a flexible printed circuit.

The controller 140 can control the gate driving circuit 120 to output a scan signal according to timing implemented in each frame. The controller 140 can convert externally received image data to match a signal format used by the data driving circuit 130, and output the converted data signal to the data driving circuit 130.

The controller 140 can receive various timing signals including a vertical synchronization signal VSYNC, a horizontal synchronization signal HSYNC, an input data enable signal DE, a clock signal CLK from the outside (e.g., host system).

The controller 140 can generate various control signals by using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, and a gate output enable signal GOE.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

A liquid crystal layer or a light emitting device can be disposed in each of the plurality of subpixels SP, depending on the type of the display device 100. In the case of a liquid crystal display device in which a liquid crystal layer is disposed in the subpixel SP, the display device 100 can include a backlight unit for supplying light to the display panel 110.

Figure 2:
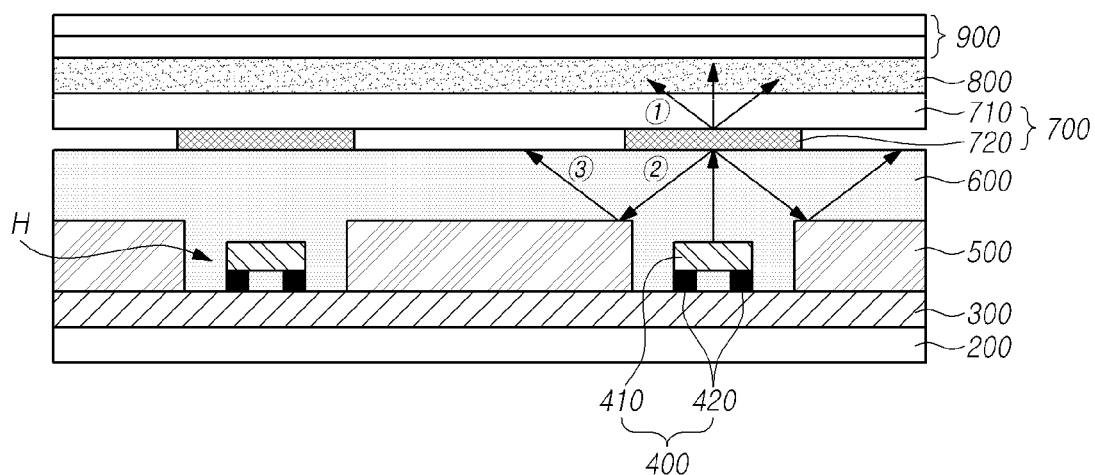
FIG. 2 illustrates an example of a cross-sectional structure of a backlight unit according to embodiments of the present disclosure.

FIG. 2 illustrates an example of a cross-sectional structure of a backlight unit according to embodiments of the present disclosure.

Referring to FIG. 2, the backlight unit can include a plurality of light sources 400 and a plurality of optical members.

The plurality of light sources 400 can be mounted on a printed circuit 300.

In some cases, the printed circuit 300 can have a structure in which lines are formed on a transparent substrate such as glass.

The printed circuit 300 mounting the light source 400 and the plurality of optical members can be accommodated in a cover bottom 200.

The light source 400 can be, for example, a light emitting diode, and can be a mini light emitting diode having a size of several hundred μm, or a micro light emitting diode having a size of several tens of μm.

Each of the plurality of light sources 400 can include a light emitting unit 410 for emitting light, and an electrode unit 420 connected to a line supplying an electrical signal to the light source 400.

The light emitting unit 410 can emit light of a white wavelength band or, in some cases, can emit light of a specific wavelength band (e.g., blue light). In the case that the light emitting unit 410 emits light of a specific wavelength band, a configuration for converting a wavelength of light can be disposed on the light source 400.

A reflection plate 500 can be disposed on at least a part of an area where the light source 400 is not disposed on the printed circuit 300.

The reflection plate 500, for example, can be in the form of a plate, and can include a plurality of holes H positioned in areas corresponding to the plurality of light sources 400, respectively.

The reflection plate 500 including the plurality of holes H can be disposed on the printed circuit 300 on which the light source 400 is mounted. Accordingly, the light source 400 can be located inside each of the plurality of holes H.

If the size of the light source 400 is small, the height of an upper end of the reflection plate 500 can be greater than the height of an upper end of the light source 400.

Alternatively, in some cases, the reflection plate 500 can be disposed in a coated form on the upper surface of the printed circuit 300. In this case, the height of the upper end of the reflection plate 500 can be smaller than the height of the upper end of the light source 400.

In the case that the light emitted from the light source 400 is scattered or reflected backward, the reflection plate 500 can reflect the light that has reached the reflection plate 500 back toward the display panel 110, so that it is possible to increase the light efficiency of the backlight unit.

A light source protection layer 600 can be disposed on the light source 400 and the reflection plate 500.

The light source protection layer 600 can be formed by, for example, molding a resin. Alternatively, the light source protection layer can be formed using an adhesive material such as optical clear adhesive (OCA), but is not limited thereto.

The light source protection layer 600 can be disposed to surround the light source 400, but in some cases, an air layer can exist between the light source 400 and the light source protection layer 600.

The light source protection layer 600 can protect the light source 400 and can perform a function of guiding the light emitted from the light source 400.

A light path control sheet 700 can be disposed on the light source protection layer 600.

The light path control sheet 700 can include a base film 710 and a plurality of light path control patterns 720 disposed on at least one of the upper and lower surfaces of the base film 710.

The base film 700 can be made of a material having high transparency, and can be made of, for example, PC or PET, but is not limited thereto.

Each of the plurality of light path control patterns 720 can be located in a region corresponding to each of the plurality of light sources 400. For instance, each light path control pattern 720 can be located in a region corresponding to one of the light sources 400.

The area of the light path control pattern 720 can be larger than that of the light source 400, for example.

The area of the light path control pattern 720 can be the same as the area of the hole H included in the reflection plate 500, for example.

Alternatively, depending on the distance between the light source 400 and the light path control pattern 720, the area of the light path control pattern 720 can be greater or smaller than the area of the hole H included in the reflection plate 500.

The light path control pattern 720 can be made of a material such as, for example, TiO2 having high reflective properties.

The light path control pattern 720 can transmit a part of the light emitted from the light source 400 (refere to ① in FIG. 2) and reflect, diffract or scatter most of the light (refer to ② in FIG. 2).

The light reflected by the light path control pattern 720 can be reflected back by the reflection plate 500. The light reflected by the reflection plate 500 can be emitted toward the display panel 110 in the region between the light sources 400 (refer to ③ in FIG. 2).

Accordingly, the luminance uniformity of the backlight unit can be improved by dispersing light in an area having a large amount of light and increasing light supplied to an area having a small amount of light.

A plurality of optical members can be disposed on the light path control sheet 700.

As an example, a color conversion sheet 800, a optical sheet 900 can be disposed. In some cases, a diffusion plate can be further disposed.

The color conversion sheet 800 can convert the wavelength of light emitted from the light source 400. Accordingly, light of a white wavelength band can be supplied from the backlight unit to the display panel 110.

The optical sheet 900 can be one of several sheets for increasing light efficiency and the like, and can be, for example, a prism sheet or a diffusion sheet.

In the embodiments of the present disclosure, even if the area of the display panel 110 is increased, it is possible to improve the uniformity of the luminance and the light efficiency displayed by the backlight unit by using the structure in which the light path control sheet 700 is disposed on the light source 400.

Accordingly, it is possible to improve the image quality displayed by the backlight unit while reducing the thickness of the backlight unit.

In addition, in embodiments of the present disclosure, a structure including a partition wall having a reflective property and a color conversion material is disposed between the light source 400 and the light path control sheet 700, so that there can be provided a method for reducing the thickness of the backlight unit and improving the wavelength conversion efficiency and light efficiency of the backlight unit.

Figure 3:
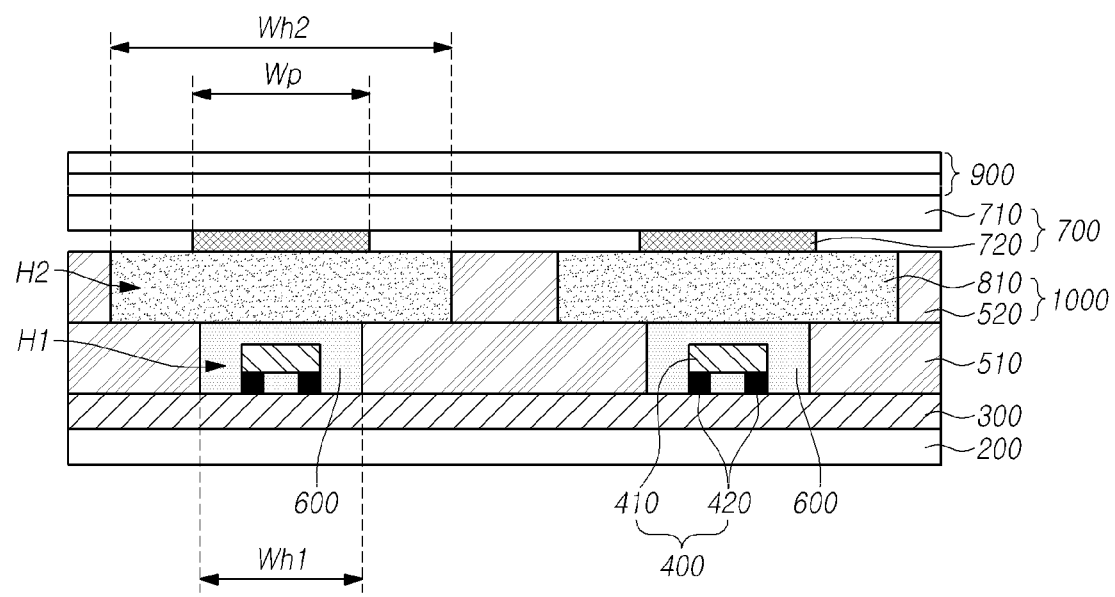
FIG. 3 illustrates another example of cross-sectional structure of a backlight unit according to embodiments of the present disclosure.
Figures 4A, 4B:
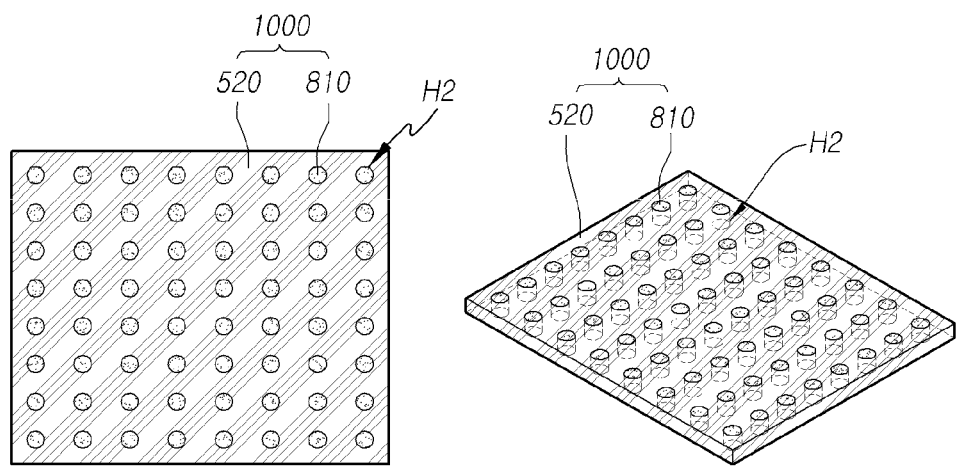
FIGS. 4A and 4B illustrate an example of a structure of a color conversion member shown in FIG. 3.

FIG. 3 illustrates another example of cross-sectional structure of a backlight unit according to embodiments of the present disclosure. FIGS. 4A and 4B illustrate an example of a structure of a color conversion member 1000 shown in FIG. 3.

Referring to FIG. 3, a plurality of light sources 400 can be disposed on a printed circuit 300.

A first reflection plate 510 can be disposed in at least a partial area of the printed circuit 300 in which the light source 400 is not disposed.

The first reflecting plate 510 can include a plurality of first holes H1.

Each of the plurality of first holes H1 can be located in an area corresponding to each of the plurality of light sources 400. For instance, the first holes H1 are disposed to correspond with the light sources 400, respectively, such that each first hole H1 is located in an area of a corresponding light source 400. Accordingly, the light source 400 can be positioned inside the first hole H1 included in the first reflection plate 510.

A light source protection layer 600 can be disposed in at least a partial area inside the first hole H1. The light source protection layer 600 can be disposed to surround at least a part of an outer surface of the light source 400.

A second reflection plate 520 can be disposed on the first reflection plate 510.

The second reflection plate 520 can be made of the same material as the first reflection plate 510 or can be made of a material different from that of the first reflection plate 510 but having a specifict reflective characteristic.

The second reflection plate 520 can include a plurality of second holes H2. Each of the plurality of second holes H2 can be located in an area corresponding to each of the plurality of first holes H1. For instance, the second holes H2 are disposed to correspond with the first holes H1 respectively, such that each second hole H2 is located in an area of a corresponding first hole H1. Accordingly, each of the plurality of second holes H2 can be located in an area corresponding to each of the plurality of light sources 400.

A color conversion layer 810 can be disposed in at least a partial area inside each of the plurality of second holes H2.

The color conversion layer 810 can be formed by, for example, mixing and curing a resin and a phosphor.

A color conversion member 1000 can include the second reflection plate 520 including a plurality of second holes H2 and the color conversion layer 810 disposed inside the plurality of second holes H2.

Referring to FIGS. 4A and 4B, the color conversion layer 810 can be disposed in each of the plurality of second holes H2 included in the second reflection plate 520, and the color conversion member 1000 can be formed.

FIGS. 4A and 4B illustrate an example in which the second hole H2 included in the second reflection plate 520 is formed in a circle shape at a position corresponding to the light source 400, however, the second hole H2 can have a shape (e.g., an elliptical shape, a rectangular shape, etc.) other than a circle shape.

In addition, one second hole H2 may not correspond to one light source 400, but can be formed to correspond to a plurality of light sources 400. For example, in the case that two or more light sources 400 included in the backlight unit form one block to perform dimming driving, one second hole H2 can be formed to correspond to each block.

Referring to FIG. 3, the second reflection plate 520 included in the color conversion member 1000 is mounted on the first reflection plate 510, and the color conversion layer 810 can be located in an area corresponding to each of the plurality of light sources 400.

Since the color conversion layer 810 is located on the light source 400, the wavelength of the light emitted from the light source 400 can be converted in the color conversion layer 810 and supplied to the upper portion. In addition, light emitted from the light source 400 can be guided by the color conversion layer 810.

Accordingly, since the color conversion sheet 800 as shown in FIG. 2 can be removed from the backlight unit, and the wavelength conversion function and the light guide function can be implemented by the color conversion member 1000, it is possible to reduce the thickness of the backlight unit.

In addition, the light guided by the color conversion layer 810 can be reflected by the second reflection plate 520 and supplied to the upper portion.

As an example, a light path control sheet 700 can be disposed on the color conversion member 1000.

The light path control sheet 700 can be disposed to be placed on the color conversion member 1000. Alternatively, the light path control sheet 700 can be disposed such that an adhesive material is interposed between the light path control sheet 700 and the color conversion member 1000.

A light path control pattern 720 included in the light path control sheet 700 can be located in an area corresponding to the light source 400.

At least a part of the light emitted from the light source 400 can pass through the color conversion layer 810 of the color conversion member 1000 to reach the light path control pattern 720.

At least a part of the light reaching the light path control pattern 720 can be reflected. The light reflected by the light path control pattern 720 can be reflected back by the first reflection plate 510 or the second reflection plate 520 and supplied to the upper portion.

The light path control pattern 720, for example, can have a specific reflectance. In addition, the reflectance of the light path control pattern 720 can be lower than the reflectance of the first reflection plate 510 or the reflectance of the second reflection plate 520.

Since the color conversion member 1000 provides both a wavelength conversion function and a light guide function, light efficiency can be increased while reducing the thickness of the backlight unit.

In addition, light passing through the color conversion layer 810 included in the color conversion member 1000 is reflected by the light path control pattern 720 and is incident back to the color conversion layer 810 to be converted into wavelength. Therefore, the wavelength conversion efficiency by the color conversion layer 810 can also be improved.

The size or area of the second hole H2 formed in the second reflection plate 520 can be set in consideration of the size or area of the first hole H1 formed in the first reflection plate 510 or the size or area of the light path control pattern 720.

The size Wp of the light path control pattern 720 can vary depending on the distance from the light source 400, for example, can be greater than or equal to the size of the first hole H1 formed in the first reflection plate 510.

The size Wh2 of the second hole H2 formed in the second reflection plate 520 can be greater than the size Wh1 of the first hole H1 formed in the first reflection plate 510. The first hole H1 can be disposed to overlap the second hole H2, and the boundary of the first hole H1 can be located inside the boundary of the second hole H2.

The size Wh2 of the second hole H2 formed in the second reflection plate 520 can be greater than the size Wp of the light path control pattern 720.

Accordingly, the size Wp of the light path control pattern 720 can be greater than or equal to the size Wh1 of the first hole H1, and can be smaller than the size Wh2 of the second hole H2.

Since the size Wh2 of the second hole H2 is greater than the size Wh1 of the first hole H1, the wavelength of the light emitted from the light source 400 can be sufficiently converted by the color conversion layer 810 disposed in the second hole H2.

Since the size Wh2 of the second hole H2 is greater than the size Wp of the light path control pattern 720, the light reflected by the light path control pattern 720 can again reach the color conversion layer 810 and be converted into wavelength, and can be reflected again by the first reflection plate 510 or the second reflection plate 520 to be supplied to the upper portion.

In embodiments of the present disclosure, there can be disposed the color conversion member including the second reflection plate 520 including the plurality of second holes H2 and the color conversion layer 810 disposed in the second holes H2, so that it is possible to easily implement a wavelength conversion function and a light guide function while reducing the thickness of the backlight unit, and increase the wavelength conversion efficiency and light efficiency of the backlight unit.

In addition, in embodiments of the present disclosure, through various structures of the second reflection plate 520 included in the color conversion member 1000, the light efficiency can be further increased by the color conversion member 1000 disposed on the light source 400.

FIGS. 5 to 9 illustrate another example of cross-sectional structures of a backlight unit according to embodiments of the present disclosure.

Figure 5:
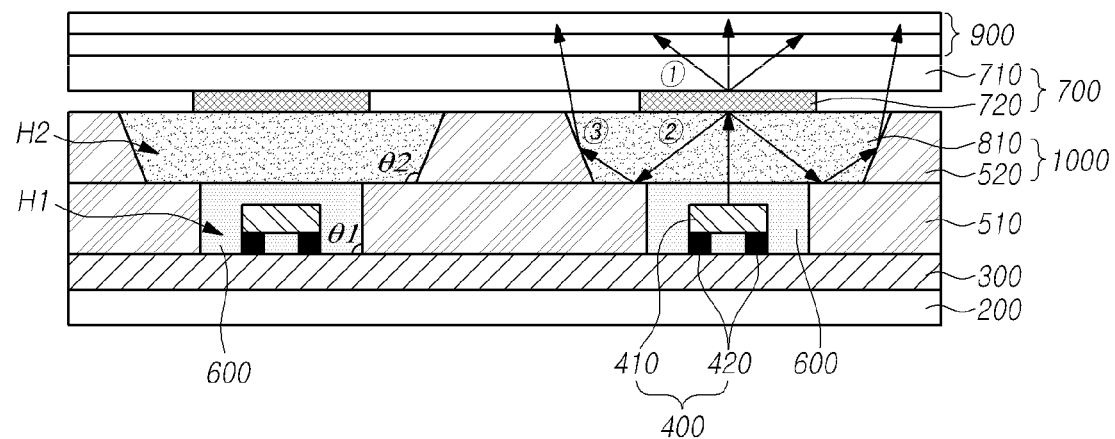
FIGS. 5 to 9 illustrate another example of cross-sectional structures of a backlight unit according to embodiments of the present disclosure.

Referring to FIG. 5, a light source 400 and a first reflection plate 510 can be disposed on a printed circuit 300.

The first reflection plate 510 can include a plurality of first holes H1. The light source 400 and a light source protection layer 600 can be disposed inside each of the plurality of first holes H1.

A color conversion member 1000 can be disposed on the first reflection plate 510. The color conversion member 1000 can include a second reflection plate 520 including a plurality of second holes H2, and a color conversion layer 810 disposed in at least a partial area inside each of the plurality of second holes H2.

A light path control sheet 700 and an optical sheet 900 can be disposed on the color conversion member 1000.

The size of the second hole H2 included in the second reflection plate 520 can be greater than the size of the first hole H1 included in the first reflection plate 510.

The second hole H2 and the first hole H1 can overlap, and the first hole H1 can be located to be included in an area overlapping the second hole H2. Accordingly, the second reflection plate 520 can be disposed on the first reflection plate 510 such that an area in which the second reflection plate 520 overlaps the first reflection plate 510 does not deviate.

In addition, an inner surface of the first hole H1 and an inner surface of the second hole H2 can have different inclinations.

The size of a first angle θ1 between the inner surface of the first hole H1 and an upper surface of the printed circuit 300 can be different from the size of a second angle θ2 between the inner surface of the second hole H2 and the upper surface of the first reflection plate 510.

As an example, the size of the second angle θ2 can be greater than the size of the first angle θ1. The first angle θ1 can be 90 degrees, and the second angle θ2 can be greater than 90 degrees.

Accordingly, the inner surface of the second hole H2 can have an inclined structure.

Since the inner surface of the second hole H2 has an inclined structure, there can be improved the efficiency in which light reflected from the light path control pattern 720 on the color conversion member 1000 is reflected again and supplied to the upper portion.

As an example, a part of the light emitted from the light source 400 can pass through the light path control pattern 720 and be supplied to the upper portion (refer to ① in FIG. 5).

Most of the light reaching the light path control pattern 720 can be reflected by the light path control pattern 720 (refer to ② in FIG. 5). The light reflected by the light path control pattern 720 can be reflected by at least one of the first reflection plate 510 and the second reflection plate 520 and supplied to the upper portion (see ③ in FIG. 5).

The inner surface of the second hole H2 in which the color conversion layer 810 is disposed between the light source 400 and the light path control sheet 700 is formed in an inclined structure, so that it is possible to increase the amount of light reflected and guided between the light source 400 and the light path control pattern 720 and supplied to the upper portion.

In addition, since the inner surface of the second hole H2 in which the color conversion layer 810 is disposed is inclined, it is possible to facilitate a process of forming the color conversion layer 810 by mixing a color conversion material and a resin.

In addition, in embodiments of the present disclosure, since the thickness of the color conversion layer 810 disposed in the second hole H2 is different from the depth of the second hole H2, it is possible to facilitate the arrangement of the optical member on the color conversion member 1000 or adjust the optical characteristics of the backlight unit.

Figure 6:
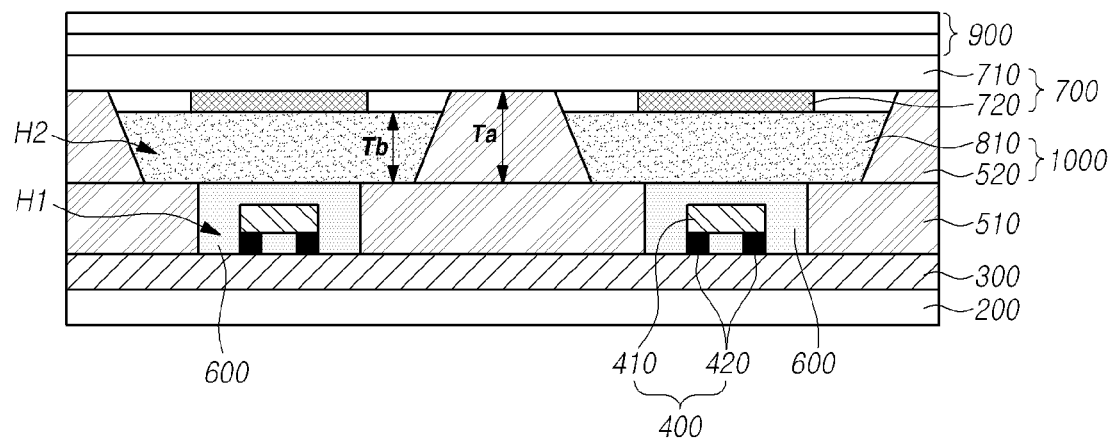

Referring to FIG. 6, a color conversion member 1000 can be disposed on a light source protection layer 600 surrounding a light source 400 and the first reflection plate 510.

The color conversion member 1000 can include a second reflection plate 520 including a plurality of second holes H2, and a color conversion layer 810 disposed in at least a partial area of the inside of the second hole H2.

A light path control sheet 700 and an optical sheet 900 can be disposed on the color conversion member 1000.

The thickness of the second reflection plate 520 included in the color conversion member 1000 can be Ta. Accordingly, the depth of the second hole H2 included in the second reflection plate 520 can be Ta.

The thickness of the color conversion layer 810 disposed in the second hole H2 can be Tb.

The thickness Tb of the color conversion layer 810 can be smaller than the thickness Ta of the second reflection plate 520.

Since the thickness Ta of the second reflection plate 520 is greater than the thickness Tb of the color conversion layer 810, the upper surface of the second reflection plate 520 can be positioned higher than the upper surface of the color conversion layer 810.

The upper surface of the second reflection plate 520 can support an optical member such as the light path control sheet 700 disposed on the color conversion member 1000.

Accordingly, the optical member such as the light path control sheet 700 can be easily disposed on the color conversion member 1000 without disposing a separate material such as an adhesive material.

The upper surface of the color conversion layer 810 can be in contact with a light path control pattern 720 positioned on the color conversion member 1000.

Alternatively, a spaced space can exist between the upper surface of the color conversion layer 810 and the light path control pattern 720.

The distance between the color conversion layer 810 and the light path control pattern 720 can be easily adjusted by adjusting the thickness Ta of the second reflection plate 520 and the thickness Tb of the color conversion layer 810.

Accordingly, if necessary, by forming an air layer between the color conversion member 1000 and the light path control pattern 720, the optical characteristics of the backlight unit can be easily adjusted.

Further, the thickness of the second reflection plate 520 included in the color conversion member 1000 can vary depending on a portion of the second reflecting plate 520, so that it is possible to adjust the optical characteristics of the backlight unit.

Figure 7:
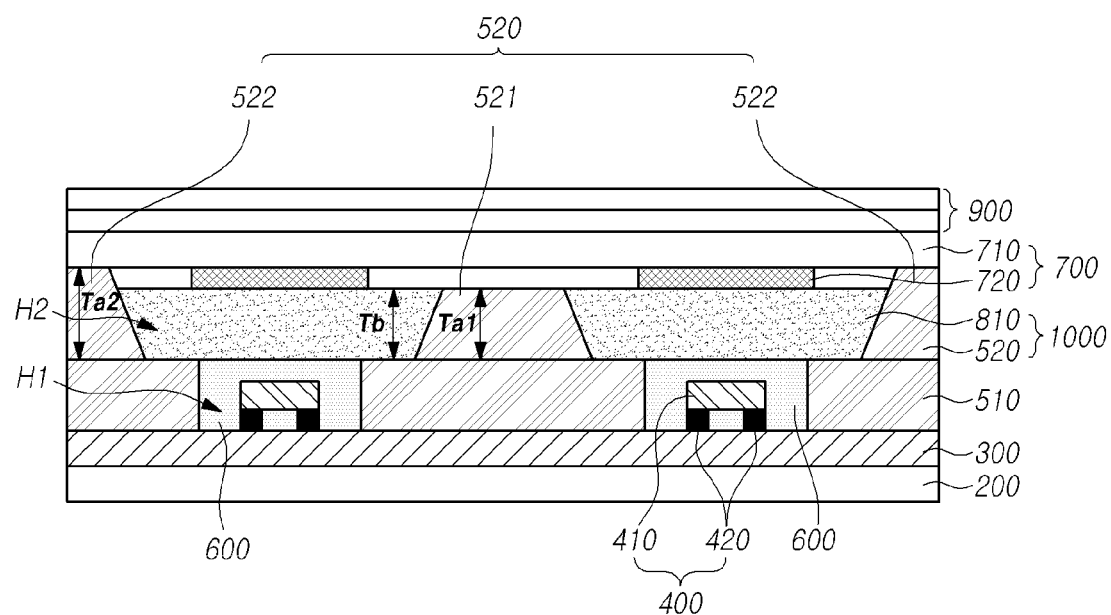

Referring to FIG. 7, a color conversion member 1000 can be disposed between a light source 400 and a light path control sheet 700.

The color conversion member 1000 can include a second reflection plate 520. The second reflection plate 520 can include a plurality of second holes H2.

The color conversion member 1000 can include a color conversion layer 810 located inside each of the plurality of second holes H2.

The thickness of the second reflection plate 520 included in the color conversion member 1000 can vary depending on the portion.

For example, the second reflection plate 520 can include a first portion 521 and a second portion 522.

The thickness of the first portion 521 of the second reflection plate 520 can be Ta1. The thickness of the second portion 522 of the second reflection plate 520 can be Ta2.

The thickness Ta2 of the second portion 522 can be greater than the thickness Ta1 of the first portion 521.

The thickness of the color conversion layer 810 can be Tb, and the thickness Tb of the color conversion layer 810 can be equal to or less than the thicknesses Ta1 and Ta2 of the second reflection plate 520.

Since the thickness of the second reflection plate 520 varies according to the portion, it is possible to adjust a light guide path between the light source 400 and the light path control sheet 700.

For example, in the case that a portion having a relatively small thickness, such as the first portion 521 of the second reflection plate 520, is located in the area between the light sources 400, the ratio of light guided from the corresponding area to the adjacent area can relatively high.

In the case that a portion having a relatively large thickness, such as the second portion 522 of the second reflection plate 520, is located in the area between the light sources 400, the ratio of light guided from the area to the adjacent area can be relatively low.

By varying the thickness according to the portion of the second reflection plate 520, the guide path of the light can be easily controlled by the disposition of the color conversion member 1000.

For example, in the case that a plurality of light sources 400 constitute one block and the light sources 400 are independently driven in units of blocks, in some cases, it is necessary to block light guiding to adjacent blocks.

The second portion 522 of the second reflection plate 520 can be located in the boundary area of the block, so that the performance of driving in block units can be improved by reducing the light guided to the adjacent block by the second portion 522 of the second reflection plate 520.

In addition, the first portion 521 of the second reflection plate 520 can be located in the inner region of the block, so that it is possible to improve the light guiding and light exiting performance inside the block.

In addition, in some cases, the second reflection plate 520 may not be disposed inside the block. The second hole H2 can be formed to correspond to one block constituted by the plurality of light sources 400.

In embodiments of the present disclosure, the color conversion layer 810 is disposed inside the second hole H2 of the second reflection plate 520, and between the light source 400 and the light path control sheet 700, so that the thickness of the backlight unit can be reduced and the wavelength conversion efficiency and light efficiency of the backlight unit can be improved.

In addition, by adjusting the thickness of the second reflection plate 520 and the thickness of the color conversion layer 810, it is possible to easily adjust the optical characteristics of the backlight unit and easily implement the optical characteristics needed for the backlight unit.

In addition, according to embodiments of the present disclosure, there can be adjusted the arrangement structure of the light source protection layer 600 disposed in the first hole H1 of the first reflection plate 510 located under the color conversion member 1000, so that it is possible to improve light extraction efficiency under the color conversion member 1000.

Figure 8:
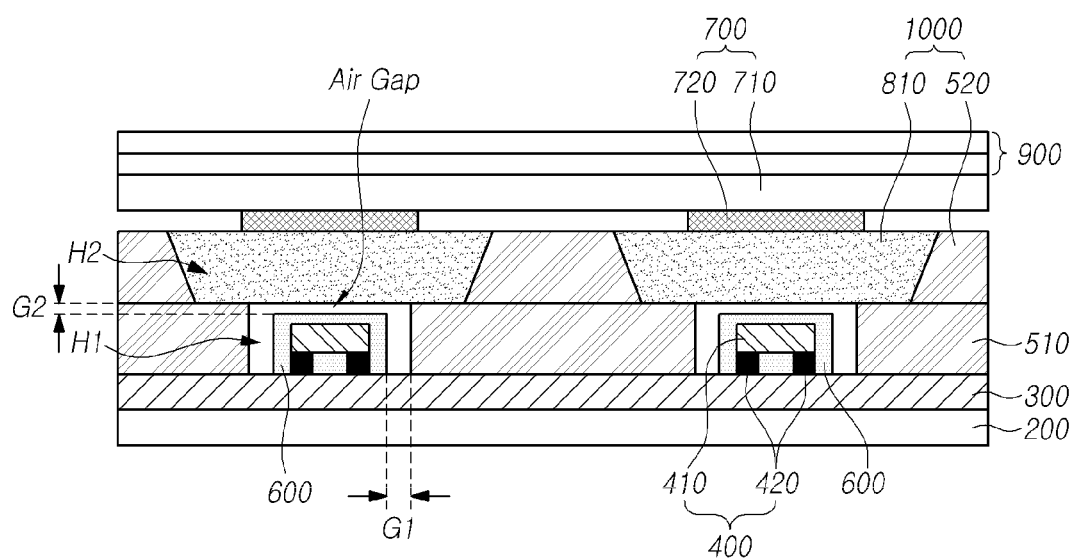

Referring to FIG. 8, a light source 400 and a first reflection plate 510 can be disposed on a printed circuit 300.

A color conversion member 1000 including a second reflection plate 520 and a color conversion layer 810 can be disposed on the first reflection plate 510. A light path control sheet 700 and an optical sheet 900 can be disposed on the color conversion member 1000.

The first reflection plate 510 can include a plurality of first holes H1. The light source 400 can be located inside each of the plurality of first holes H1.

A light source protection layer 600 can be disposed in at least a partial area inside each of the plurality of first holes H1.

The light source protection layer 600 can be disposed to surround at least a portion of the outer surface of the light source 400. The light source protection layer 600 can provide a function of protecting the light source 400 and can provide a function of guiding the light emitted from the light source 400.

In a state in which the light source 400 and the first reflection plate 510 are disposed on the printed circuit 300, the light source protection layer 600 can be formed by filling a material (e.g., resin) forming the light source protection layer 600 into a partial area of the first hole H1.

In this case, a gap such as G1 can exist between the side surface of the light source protection layer 600 and the inner surface of the first hole H1. Further, a gap such as G2 can exist between the upper surface of the light source protection layer 600 and the color conversion layer 810.

An air layer can be formed around the light source protection layer 600 positioned inside the first hole H1.

The light emitted from the light source 400 can be emitted to the outside through the light source protection layer 600, the air layer, and the color conversion layer 810 having different refractive indices.

Since layers having different refractive indices are overlapped on the path of the light emitted from the light source 400 and a specific air layer is formed, it is possible to increase the efficiency of supplying the light emitted from the light source 400 to the upper portion.

In a structure in which the color conversion member 1000 is disposed on the first reflection plate 510, the air layer is formed under the color conversion member 1000, so that it is possible to implement a structure capable of increasing light extraction efficiency through an easy process.

Alternatively, in some cases, as in the above example, an air layer can be formed between the upper surface of the color conversion layer 810 and the light path control pattern 720 by adjusting the thickness of the second reflection plate 520.

Accordingly, it is possible to control or improve the light extraction efficiency of the backlight unit by minimizing an increase in the thickness of the backlight unit and allowing a thin air layer to be formed in various areas on the light path.

In addition, an air layer is formed inside the first hole H1 of the first reflection plate 510, and at least a portion of the light source protection layer 600 is in contact with the color conversion layer 810, thereby increasing the light extraction efficiency.

Figure 9:
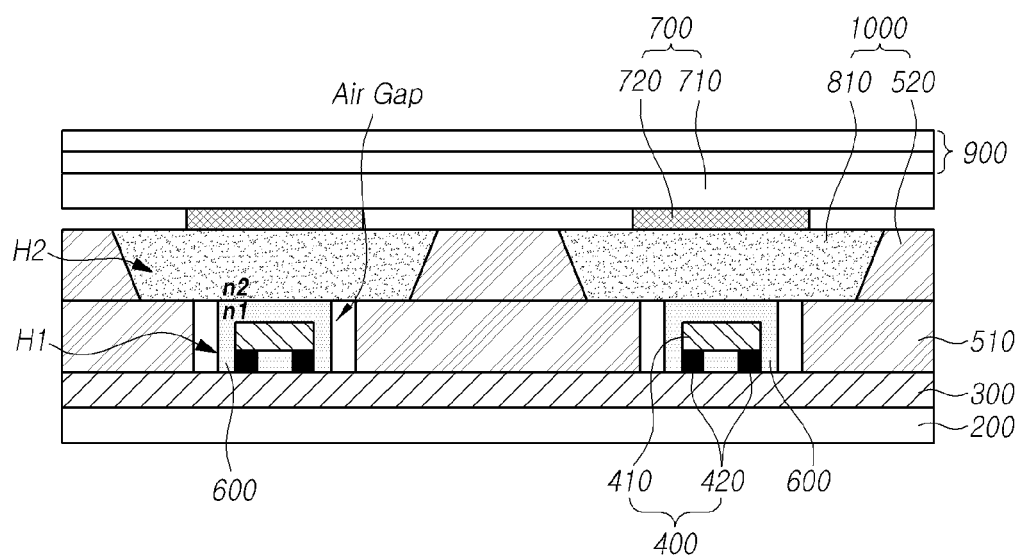

Referring to FIG. 9, a first reflection plate 510 including a plurality of first holes H1 can be disposed on a printed circuit 300 on which a light source 400 is mounted.

The light source 400 can be located inside the first hole H1, and a light source protection layer 600 can be disposed in at least a partial area of the inside of the first hole H1.

A color conversion member 1000 can be disposed on the first reflection plate 510.

The color conversion member 1000 can include a second reflection plate 520. Further, the color conversion member 1000 can include a color conversion layer 810 disposed inside each of a plurality of second holes H2 included in the second reflection plate 520.

Each of the plurality of second holes H2 can be disposed to correspond to each of the plurality of first holes H1. The size of the second hole H2 can be greater than the size of the first hole H1.

A light source protection layer 600 positioned inside the first hole H1 included in the first reflection plate 510 can be disposed in a partial area of the inside of the first hole H1. The light source protection layer 600 can be disposed to surround the light source 400.

The side surface of the light source protection layer 600 can be spaced apart from an inner surface of the first hole H1.

At least a portion of an upper surface of the light source protection layer 600 can be in contact with a lower surface of the color conversion layer 810.

In a structure in which the light source protection layer 600 is disposed in contact with the color conversion layer 810, the refractive index of the light source protection layer 600 can be different from the refractive index of the color conversion layer 810.

For example, if the refractive index of the light source protection layer 600 is n1 and the refractive index of the color conversion layer 810 is n2, the refractive index n1 of the light source protection layer 600 can be greater than the refractive index n2 of the color conversion layer 810.

The refractive index of the light source protection layer 600 in direct contact with the light source 400 can be large. In addition, the refractive index of the color conversion layer 810 in contact with the upper surface of the light source protection layer 600 from which the light emitted from the light source 400 is emitted can be small.

Since the light emitted from the light source 400 sequentially passes through the high refractive layer and the low refractive layer to be emitted, there can be improved the light diffusion performance at the interface between the light source protection layer 600 and the color conversion layer 810.

In addition, since an air layer exists in a partial area of the interior of the first hole H1, it is possible to increase the extraction efficiency of the light emitted from the light source 400.

As described above, according to the embodiments of the present disclosure, in the structure in which the color conversion member 1000 is disposed between the light source 400 and the light path control sheet 700, the light extraction efficiency or light diffusion performance can be improved through the structure of the light source protection layer 600 disposed inside the first hole H1 positioned under the color conversion member 1000.

According to the above-described embodiments of the present disclosure, since the color conversion member 1000 is disposed in the path through which the light emitted from the light source 400 reaches the light path control sheet 700, it is possible to easily implement the wavelength conversion function and the light guide function by the color conversion member 1000.

The color conversion member 1000 is implemented by a method of disposing the color conversion layer 810 in the second hole H2 formed in the second reflection plate 520, accordingly, the light reflection by the second reflection plate 520 occurs in the region between the light sources 400, thereby improving the light efficiency of the backlight unit.

In addition, there can adjust the thickness of the second reflection plate 520 and the thickness of the color conversion layer 810, or adjust the structure of the light source protection layer 600 disposed in the first hole H1 of the first reflection plate 510, so that it is possible to easily realize the optical characteristic needed for to the backlight unit while minimizing an increase in the thickness of the backlight unit.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure.

Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
a display panel; and
a backlight unit configured to supply light to the display panel,
wherein the backlight unit comprises:
a plurality of light sources disposed on a printed circuit;
a first reflection plate disposed on the printed circuit and including a plurality of first holes located in areas corresponding respectively to the plurality of light sources;
a second reflection plate disposed on the first reflection plate, and including a plurality of second holes located in areas corresponding respectively to the plurality of first holes;
a light path control sheet disposed on the second reflection plate and including a plurality of light path control patterns positioned in areas corresponding respectively to the plurality of second holes,
wherein the second reflection plate further includes a color conversion layer disposed in at least a partial area inside each of the plurality of second holes,
wherein a width of each of the plurality of light path control patterns is greater than or equal to a width of each of the plurality of first holes and is smaller than a width of each of the plurality of second holes,
wherein each of the plurality of light path control patterns is semi-transmissive and semi-reflective,
wherein the plurality of second holes are between the plurality of light path control patterns and the plurality of first holes, and
wherein each of the plurality of second holes extends through opposite sides of the second reflection plate and includes an inclined side surface that does not overlap with any of the plurality of light path control patterns, the inclined side surface being inclined with respect to an upper surface of the first reflection plate.

2. The display device of claim 1, wherein a size of a first angle between an inner surface of each of the plurality of first holes and an upper surface of the printed circuit is different from a size of a second angle between the inclined side surface of each of the plurality of second holes and an upper surface of the first reflection plate.

3. The display device of claim 2, wherein the size of the second angle is greater than the size of the first angle.

4. The display device of claim 1, wherein an area of each of the plurality of second holes is greater than an area of each of the plurality of first holes.

5. The display device of claim 1, wherein a boundary of each of the plurality of first holes is located inside a boundary of each of the plurality of second holes.

6. The display device of claim 1, wherein a thickness of at least a portion of the second reflection plate is greater than a thickness of the color conversion layer.

7. The display device of claim 1, wherein the second reflection plate comprises:
a first portion having a first thickness, and
a second portion having a second thickness greater than the first thickness of the first portion.

8. The display device of claim 1, wherein each of the plurality of light path control patterns reflects at least a part of a light emitted from each of the plurality of light sources, and
a reflectance of each of the plurality of light path control patterns is smaller than a reflectance of the second reflection plate.

9. The display device of claim 1, further comprising:
a light source protection layer located in at least a partial area inside each of the plurality of first holes, and surrounding at least a portion of an outer surface of each of the plurality of light sources.

10. The display device of claim 9, wherein an air layer is provided in at least a partial area between the light source protection layer and the color conversion layer.

11. The display device of claim 9, wherein a side surface of the light source protection layer is spaced apart from an inner surface of a corresponding first hole among the plurality of first holes.

12. The display device of claim 9, wherein at least a portion of an upper surface of the light source protection layer is in contact with a lower surface of the color conversion layer.

13. The display device of claim 12, wherein a refractive index of the light source protection layer is a first refractive index, and a refractive index of the color conversion layer is a second refractive index smaller than the first refractive index.

14. The display device of claim 1, wherein each of the plurality of second holes is in direct communication with a corresponding one of the plurality of first holes.

15. A backlight unit comprising:
a plurality of light sources disposed on a printed circuit;
a first reflection plate disposed on the printed circuit and including a plurality of first holes located in areas corresponding respectively to the plurality of light sources;
a second reflection plate disposed on the first reflection plate, and including a plurality of second holes located in areas corresponding respectively to the plurality of first holes; and
a light path control sheet disposed on the second reflection plate and including a plurality of light path control patterns positioned in areas corresponding respectively to the plurality of second holes,
wherein the second reflection plate further includes a color conversion layer disposed in at least a partial area inside each of the plurality of second holes,
wherein a width of each of the plurality of light path control patterns is greater than or equal to a width of each of the plurality of first holes and is smaller than a width of each of the plurality of second holes,
wherein each of the plurality of light path control patterns is semi-transmissive and semi-reflective,
wherein the plurality of second holes are between the plurality of light path control patterns and the plurality of first holes, and
wherein each of the plurality of second holes includes a first inclined side surface and a second inclined side surface disposed opposite to the first inclined side surface and inclined in an opposite direction than the second inclined side surface, and each of the plurality of light path control patterns is arranged between the first and second inclined side surfaces of a corresponding one of the plurality of second holes in a plan view.

16. The backlight unit of claim 15, wherein the plurality of light path control patterns do not overlap with any of the first and second inclined side surfaces of the plurality of second holes.

17. The backlight unit of claim 15, wherein each of the plurality of second holes includes an upper opening in an upper surface of the second reflection plate and a lower opening in a lower surface of the second reflection plate, and
wherein the upper opening is wider than the lower opening.

18. The backlight unit of claim 17, wherein both of the upper opening and the lower opening are wider than each of the plurality of first holes and each of the plurality of light path control patterns.

19. The backlight unit of claim 15, wherein each of the plurality of second holes is in direct communication with a corresponding one of the plurality of first holes.

20. A display device comprising:
a display panel; and
a backlight unit configured to supply light to the display panel,
wherein the backlight unit comprises:
a plurality of light sources disposed on a printed circuit;
a first reflection plate disposed on the printed circuit and including a plurality of first holes located in areas corresponding respectively to the plurality of light sources;
a second reflection plate disposed on the first reflection plate, and including a plurality of second holes passing through the second reflection plate in areas corresponding respectively to the plurality of first holes; and
a light source protection layer located in at least a partial area inside each of the plurality of first holes, and surrounding at least a portion of an outer surface of each of the plurality of light sources,
wherein the second reflection plate further includes a color conversion layer disposed in at least a partial area inside each of the plurality of second holes,
wherein at least a portion of an upper surface of the light source protection layer is in contact with a lower surface of the color conversion layer,
wherein a refractive index of the light source protection layer is a first refractive index, and
wherein a refractive index of the color conversion layer is a second refractive index smaller than the first refractive index.

* * * * *